Sept. 14, 1926.  1,599,803
F. WAYMAN
DEVICE FOR CONTROLLING THE OPERATION OF WORKMEN'S TIME CLOCKS
Filed Oct. 27, 1923   6 Sheets-Sheet 2
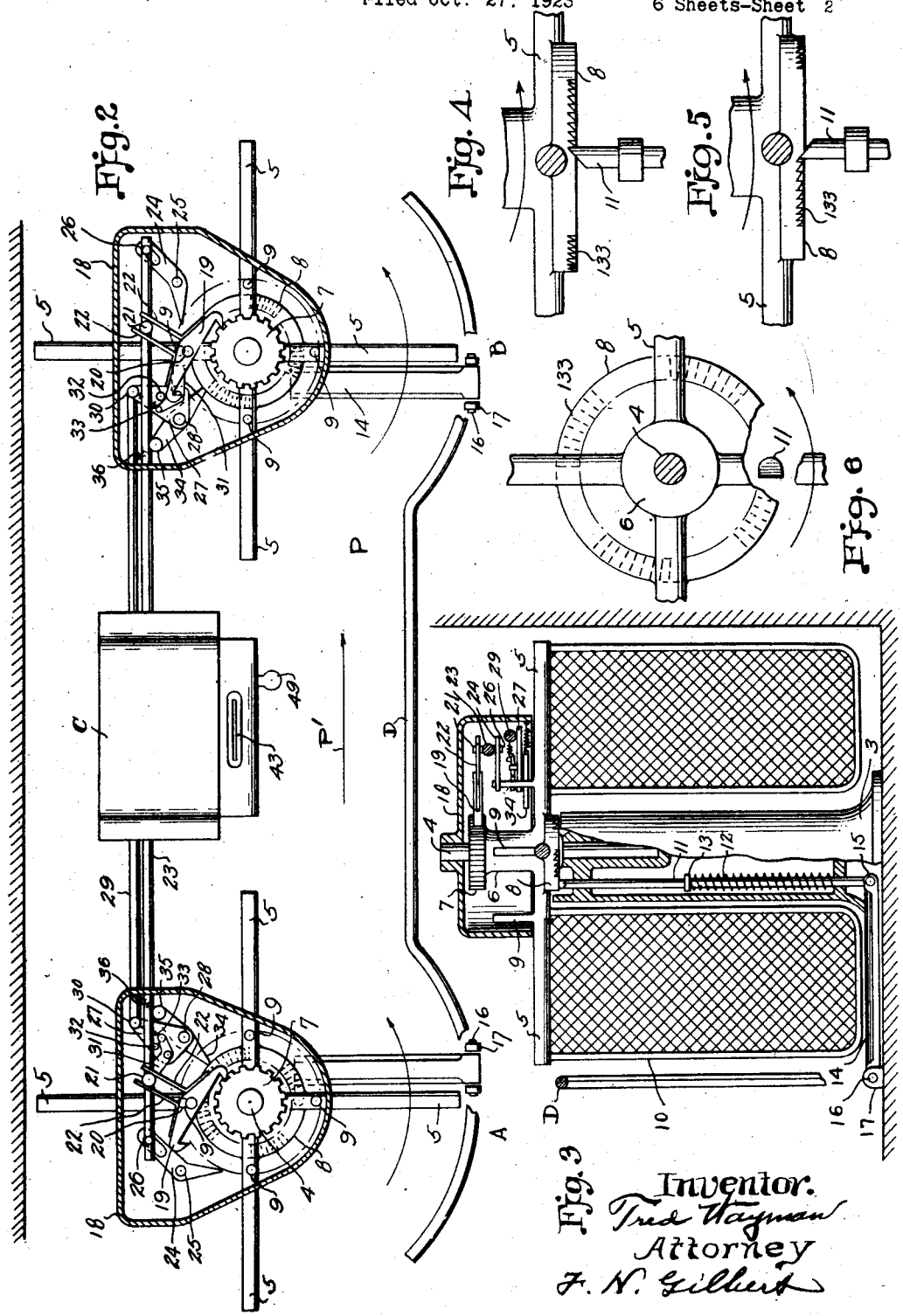

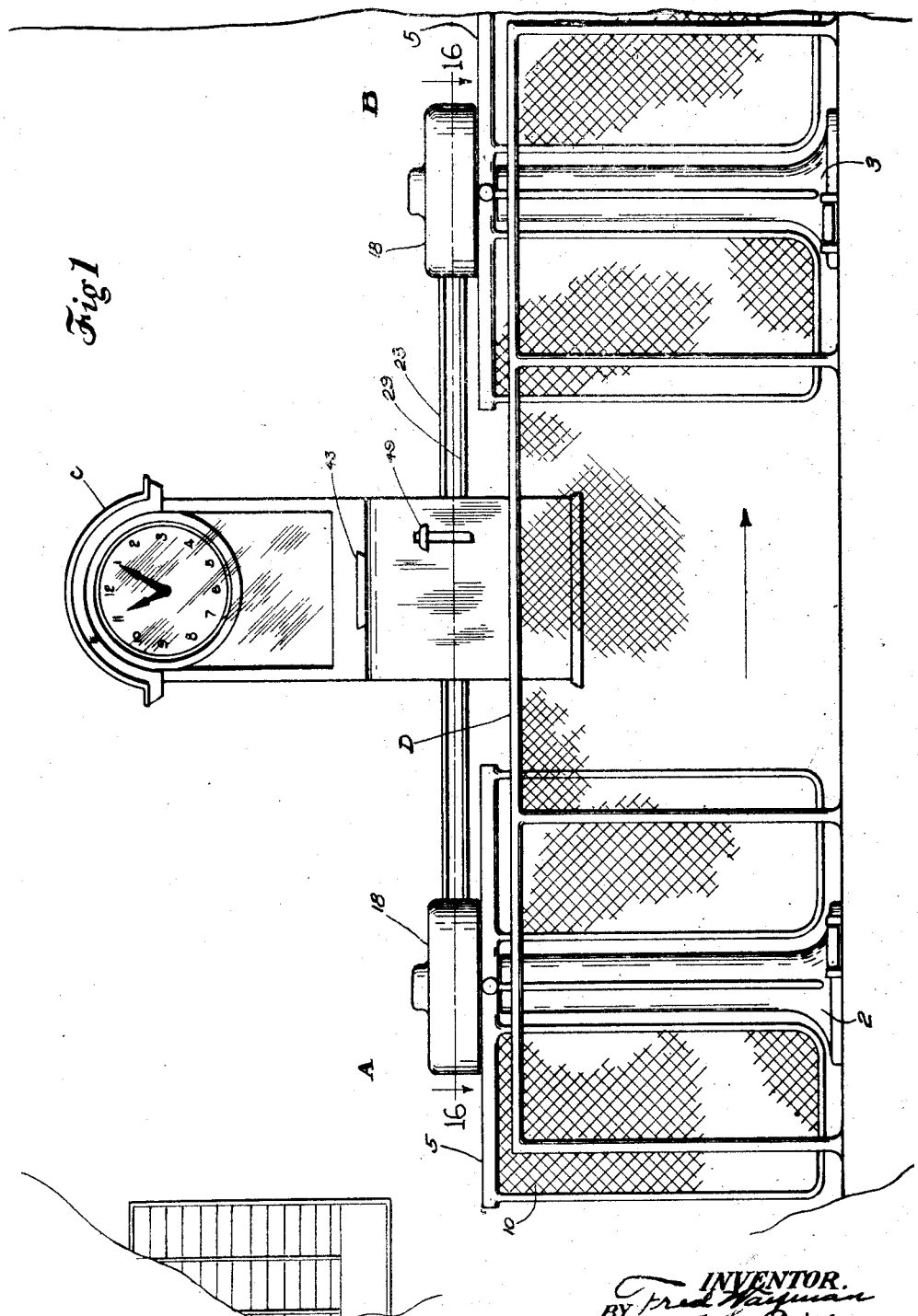

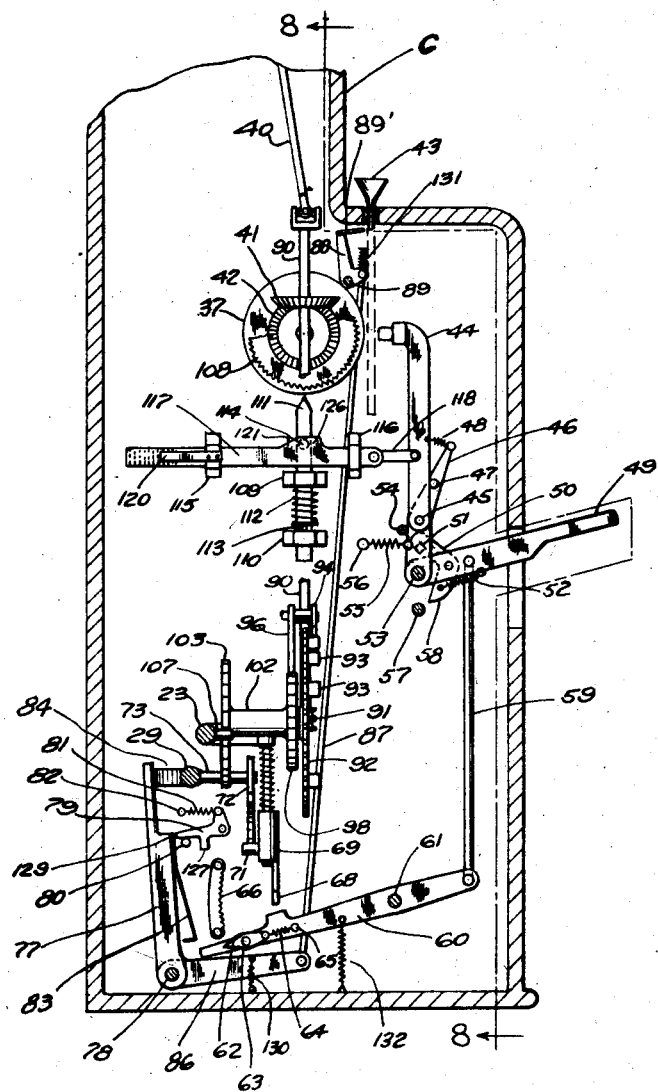

Sept. 14, 1926.　　　　　　　　　　　　　　　　1,599,803
F. WAYMAN
DEVICE FOR CONTROLLING THE OPERATION OF WORKMEN'S TIME CLOCKS
Filed Oct. 27, 1923　　　6 Sheets-Sheet 4

INVENTOR.
Fred Wayman
BY F. N. Gilbert
ATTORNEY.

Sept. 14, 1926.                                                          1,599,803
F. WAYMAN
DEVICE FOR CONTROLLING THE OPERATION OF WORKMEN'S TIME CLOCKS
Filed Oct. 27, 1923          6 Sheets-Sheet 5
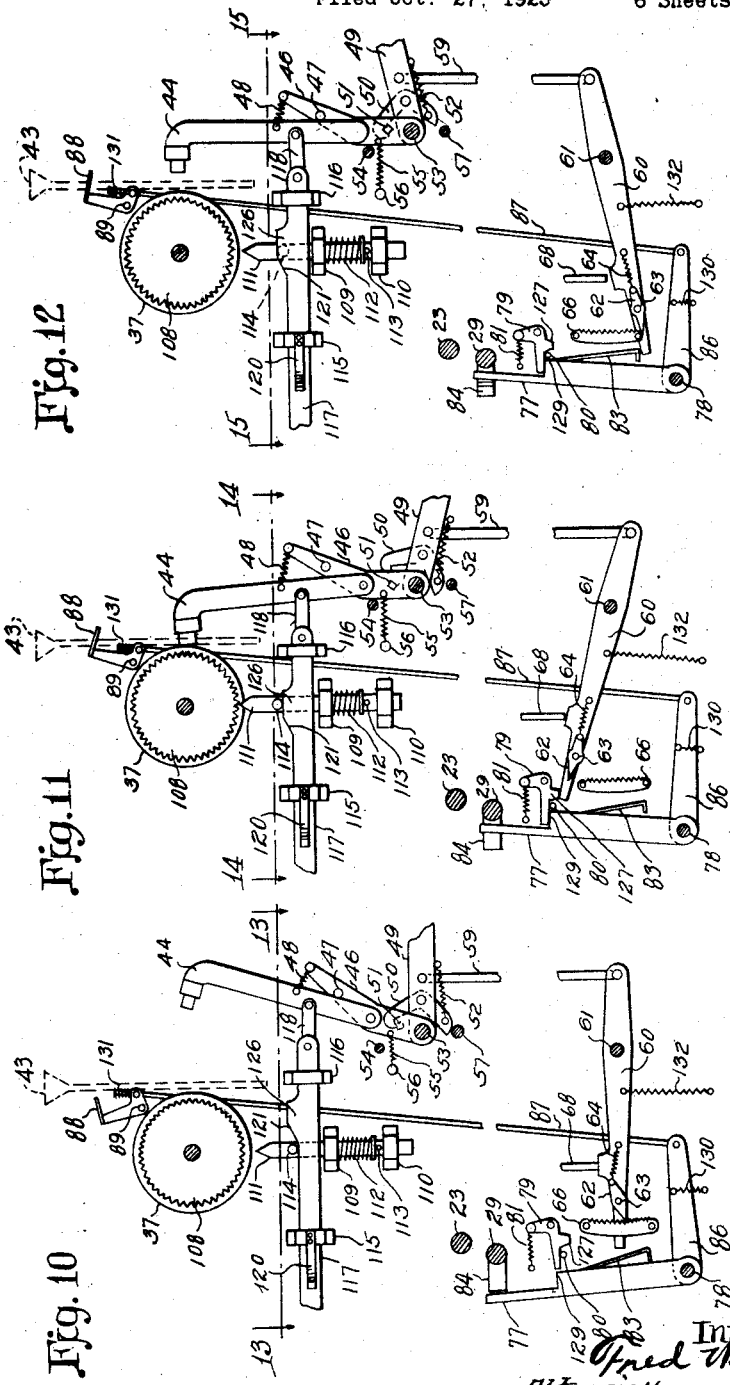

Sept. 14, 1926.
F. WAYMAN
1,599,803
DEVICE FOR CONTROLLING THE OPERATION OF WORKMEN'S TIME CLOCKS
Filed Oct. 27, 1923    6 Sheets-Sheet 6
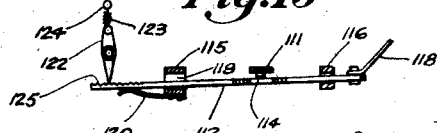
*Fig.15*
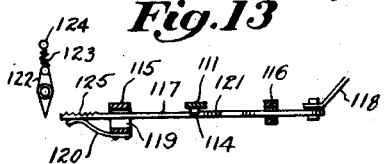
*Fig.13*
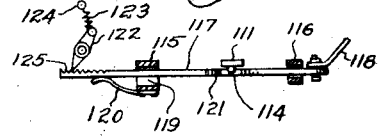
*Fig.14*
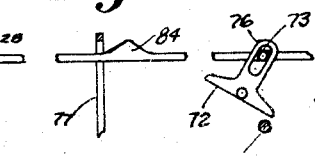
*Fig.16*
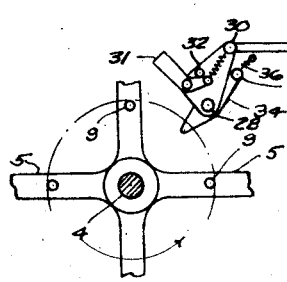
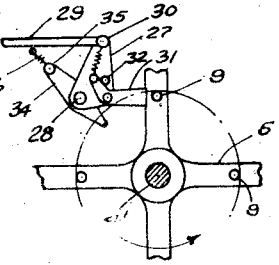
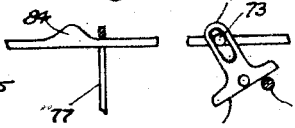
*Fig.17*
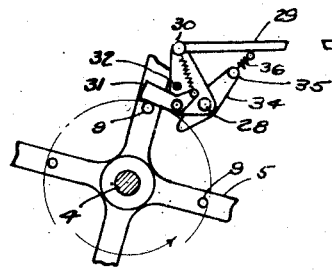
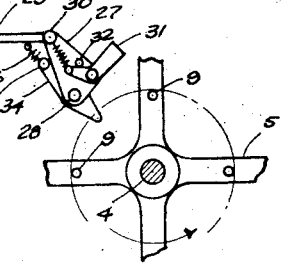
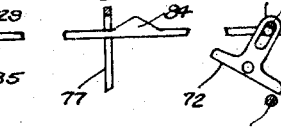
*Fig.18*
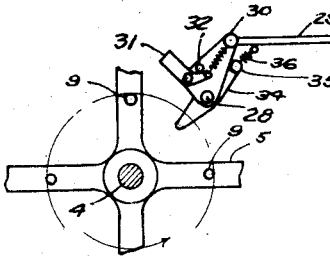
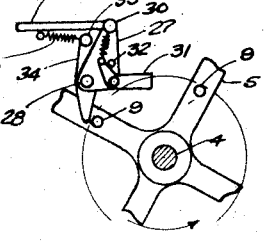
INVENTOR
Fred Wayman
BY
F. N. Gilbert
ATTORNEY Patented Sept. 14, 1926.

1,599,803

UNITED STATES PATENT OFFICE.

FRED WAYMAN, OF BINGHAMTON, NEW YORK.

DEVICE FOR CONTROLLING THE OPERATION OF WORKMEN'S TIME CLOCKS.

Application filed October 27, 1923. Serial No. 671,233.

This invention relates to time recording mechanisms, generally called time clocks, which are used at a works or office entrance to register the arrival and departure of the employees.

More particularly the invention relates to controlling means for time clocks of the type wherein time is recorded by printing on a card inserted in a card receiving slot in the clock case.

One important object of the invention is to provide an improved means operated by the passage of the employee which prevents errors in the stamping of the employee's card.

A second object is to provide improved means of time clock control which operates to prevent a card being stamped more than once during the passage of an employee past the clock.

A third important object of the invention is to provide improved time clock controlling mechanism which acts to prevent an employee from stamping more than one card during his movement past the clock.

A fourth object of the invention is to provide an improved time clock control which restrains the employee from leaving the vicinity of the clock without operating the stamping mechanism by the insertion of a card in the proper place.

A fifth object of the invention is to provide improved means for preventing surreptitious tampering with the time mechanism of a time clock while holding the operating lever in depressed position.

A sixth object of the invention is to provide an improved form of automatic reversing mechanism for use in connection with such a clock, the mechanism being arranged to control the direction of movement of the employees.

With the above and other objects in view as will be hereinafter apparent, the invention consists in general of certain details of construction and combinations of parts hereinafter fully described, illustrated in the accompanying drawings and specifically claimed.

In the accompanying drawings like characters of reference indicate like parts in the several views, and:

Figure 1, is a front elevation showing the general arrangement of runway, turnstiles and time clock in accordance with this invention.

Figure 2, is a plan view thereof, partly in section.

Figure 3, is a vertical sectional view through one of the turnstiles employed herewith.

Figure 4, is a detail of a portion of one of the turnstiles disclosing the ratchet mechanism thereof in elevation.

Figure 5, is a similar view of the ratchet mechanism of the other turnstile.

Figure 6, is a plan view of one of said ratchet mechanisms.

Figure 7, is a vertical section through the lower part of the time clock used herewith, the section being at right angles to Figure 1.

Figures 10, 11 and 12 are views showing certain parts of the mechanism for stamping the cards, the views being on the same section plane as Figure 7 and disclosing successive steps in the operation.

Figure 13 is a section on the line 13—13 of Figure 10.

Figure 14 is a section on the line 14—14 of Figure 11.

Figure 15 is a section on the line 15—15 of Figure 12.

Figure 16 is a detail semidiagrammatic view substantially on the line 16—16 of Figure 1, the view shows one position of the turnstile operated controlling mechanism.

Figure 17 is a view showing the parts disclosed in Figure 16 in a second position.

Figure 18 is a view of the parts shown in Figure 16 in a third position.

Figure 9:
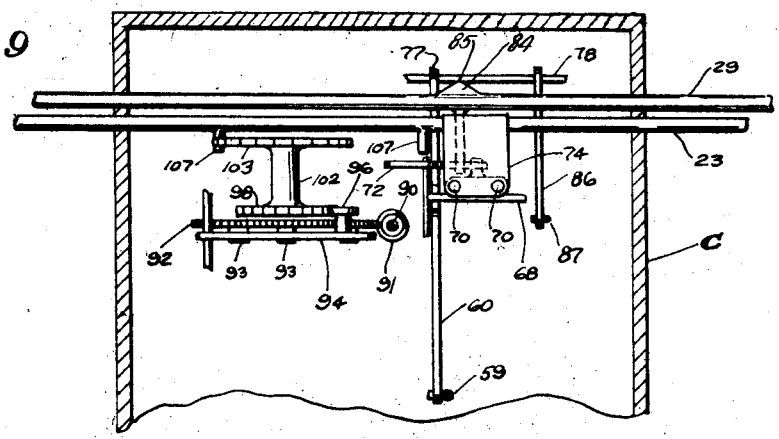
Figure 9, is a section on the line 9—9 of Figure 8.

The invention consists in general of a pair of turnstiles A and B arranged adjacent the entrance of the works at opposite ends of a passage or runway P having at one side a time clock C and at the other a guard rail D. Thus the workmen on entering and leaving the works pass through the turnstiles successively in order to operate the time clock and stamp the time on the cards used for this purpose.

Considering first the turnstiles. Each of these turnstiles consists of a standard or base 2 and 3, respectively wherein is journalled a vertical shaft 4 carrying at its upper end a hub 6 from which radiate arms 5. On each shaft 4 is an edge ratchet 7 while beneath the hub is a face ratchet 8 having ratchet teeth on its under surface engaged by the bevelled end of a vertically guided pawl rod 11 which is held in yieldably raised position by a spring 12 surrounding the pawl rod and bearing at its lower end against the bottom of the standard 2 and at its upper end against a collar 13 fixed on the rod 11. The lower end of the rod 11 is connected by a pin 15 with the normally raised end of a pedal 14 which is supported at its other end by trunnions 16 mounted in bearings 17. On each of the turnstile arms 5 is an upstanding pin 9. The upper end of each turnstile is covered by a hood or housing 18 and depending from this hood is a stud 20 whereon is mounted a double ended pawl 19, the pawl being pivoted centrally of its length and so positioned that, upon being rocked in one direction one end engages the ratchet 7 while opposite rocking of the pawl engages its other end with said ratchet. Thus the pawl prevents turning of the turnstile in one direction or the other in accordance with the engagement of one or the other of its ends. This pawl is formed somewhat like the anchor of a watch escapement and in order to permit the engaged end to ride out of the spaces between the ratchet teeth upon the turnstile being turned in the proper direction there is provided a pair of spaced leaf springs 22 which extend laterally from the back of the pawl and embrace a pin 21 mounted on a sliding rod 23. This rod passes from one turnstile to the other through the time clock C and since the turnstile construction is alike at each end a longitudinal sliding movement of the rod serves to change the positions of the pawls 19 in each turnstile simultaneously. Thus by moving the rod to the right as in Figure 2 traffic is permitted through the runway P in the direction of the arrow P' while movement to the left allows traffic to pass in the opposite direction. From one cause or another it may happen that the rod is either not fully moved to the right or left or becomes somewhat displaced from its correct position. To ensure the rod being fully moved there is provided at each turnstile a rocking lever 24 which is pivoted intermediate its ends to a stud 25 depending from the housing 18. This lever has a slot at one end engaging a pin 26 on the rod 23 and its other end moves between the positions shown at the right and left of Figure 2, passing through the path of the pins 9 during this movement. Under these conditions if the rod 23 is in any position intermediate its extreme right and left positions the lever 24 will be engaged by one of the pins 9 upon either turnstile being rotated so that the rocking lever will be moved and thus move the rod 23 to its extreme position. This rod 23 is preferably termed the reversing rod.

It is here to be observed that the ratchets 8 are oppositely arranged so that, irrespective of the positions of the pawls 19 a person can only rotate the turnstiles for exit from the passage P from inside such passage by stepping on the treadle 14 at the respective end and in order to prevent this being done from the outside guards 10 are provided which depend from the arms 5 to points adjacent the floor, just enough clearance being allowed to permit the guards to pass over the pedals 14.

Depending from each hood 18 is a pivot pin 28 on which is mounted a bell crank 27 pivotally connected at 30 to a rod 29 which extends through the clock C. This rod is preferably termed the lock rod. On the bell crank is pivoted a bell crank lever 31, one arm of which is held against a pin 32 by a spring 33. Now this rod 29 is movable to the right and to the left and, as can be seen in Figure 2, when the rod is moved to the right, the right hand lever 31 lies in the path of the pins 9 on the right hand turnstile, the left hand lever 31 being out of the path of the left hand pins 9. There is also pivoted on each of the pins 28 a lever 34 having one arm in the path of the pins 9 and the other arm provided with a lug 35 held against the side of the bell crank lever 27 adjacent the pivot 30 by a spring 36, which has one end connected to the lever 34 and its other end connected to the casing 18.

Now consider Figure 2, we will suppose that an employee enters through the turnstile A, owing to the relation of the lever 34 with the bell crank 27, the lever swings free without moving the bell crank when the pin 9 engages said lever, consequently there will be no movement of the rod 29. When the employee passes out one of the pins 9 on the turnstile B strikes the small bell crank and swings the bell crank 27 so that the rod 29 is shifted to the left.

Figure 8:
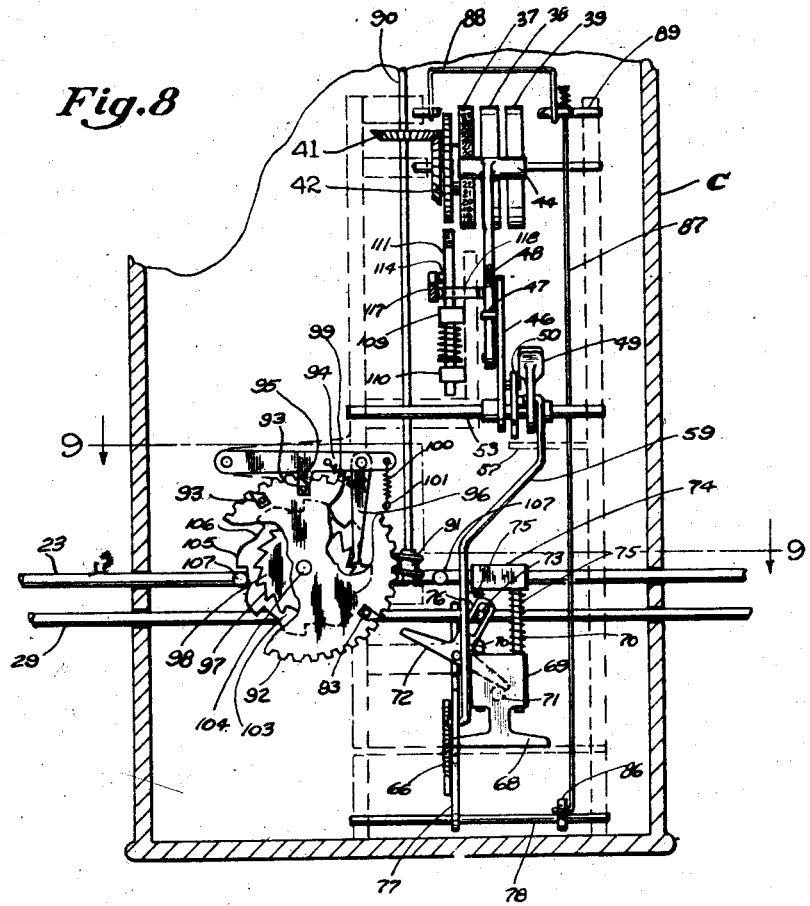
Figure 8, is a section on the line 8—8 of Figure 7.

Within the time clock C, as shown in Figures 7, 8 and 9, is a frame work supporting the usual type wheels 37, 38 and 39 driven from the clock movement, (not shown) by means of the shaft 40 and gears 41 and 42. These type wheels are connected in the usual manner but the specific construction which compels said wheels to move in proper relation is common to time clocks and is not here shown. Adjacent the type wheels the casing of the clock C is provided with a card chute or guide 43 furnishing the usual means for permitting the insertion of the cards for stamping. In front of the type wheels is the printing arm or platen 44 which is pivoted on a pin 45 carried by an arm 46 which is in turn pivoted on a cross shaft 53. On the arm 46 is a stop pin 47 which is engaged by the front face of the arm 44 and is held in such engagement by a spring 48 connecting the hammer and upper end of the lever 46. At 49 is the operating lever and this lever is pivoted likewise on the cross shaft 53. On the lever 49 is pivoted a hook 50 which is held in engagement with a post 51 on the lever 46 by means of spring 52. At 54 is a stop which limits the movement of the lever 46 rearwardly, said lever being held against said stop by means of a spring 55 connecting the lever and post 56. The hook 50 is provided with a cam surface 58 and in the path of movement of this cam surface is a throw-out pin 57. Now under these conditions depression of the lever 49 will rock the entire lever system in such manner that the hammer 44 will move away from the type wheels. On the hook surface 58 engaging the pin 57 the post 51 will be freed from the hook 50 and the spring 55 will throw the hammer quickly back to the type rolls or wheels and thus print the card inserted in receiver 43.

Pivoted at its upper end to the lever 49 is link 59 which has its lower end connected to one arm of a lever 60 pivoted on the cross shaft 61. This lever 60 carries a pawl 62 mounted on pivot 63 and held in normal alignment with the lever 60 by spring 64 having one of its ends secured at 65. In the path of the pawl there is supported a ratchet 66. This pawl and ratchet are so arranged that the point of the pawl 62 engages the ratchet teeth on both the upper and downward motion of the trip lever 60 in such manner that the lever must complete its full movement before its return in the opposite direction can be effected. This trip lever 60 is normally held in the position, shown in Figure 7, by means of the spring 132. Attached to the reverse rod 23 is a bracket 74 from which are suspended the guide rods 70. On these rods slides the crosshead 69 which is normally forced downward by means of the spring 75. On the crosshead 69 is a pin 71 which engages one arm of an inverted T-shaped lever 72 having in its stem a slot 76 engaging a pin 73 on the rod 29. At 77 is a rock arm which is fixed upon a shaft 78 pivoted in the lower part of the casing and the rock arm is adapted to be restrained from forward movement by means of a latch 79 normally held in engagement with pin 80 forming a limit stop by means of a spring 81 secured to a post 82. The end of the latch 79 engages behind a shoulder 129 on the arm 77 but is raised above this shoulder by the action of the lever 60 in striking a projection 127 on the latch, upon depression of the lever 49. On the arm 77 is a spring 83 which forms a latch for the lever 60 when the arm 77 moves forward and the lever 60 returns to its normal position, shown in Figure 7. Thus after one operation of the lever 49 a second operation is prevented. Furthermore in order to render it impossible to insert a second card the lock shaft 78 is provided with a rock arm 86 extending forwardly from the shaft and connected by a rod 87 with a bell crank lever 88 pivoted adjacent the chute 43 on a pivot 89 arranged to swing beneath the chute 43 and close off admission of the cards to the case of the clock. Thus when the operating lever is depressed not only will it be prevented from a second depression but a second card can not even be inserted. A spring 130 holds the arm 86 downward and at the upper end of the rod 87 there is provided a spring 131 providing a yielding connection between the rod 87 and bell crank 88, so that as a card is put in the chute the chute will be closed until the card is withdrawn.

The several steps just described can be clearly seen by referring to Figures 10, 11 and 12. The lower end of the clock operated shaft 40 is indicated at 90 (see Fig. 8) and at the bottom of this shaft is a worm 91 which meshes with a worm wheel 92 fixed on a shaft 104. The operation of these parts is such that the worm wheel will rotate once in twenty-four hours. Arranged about the periphery of this worm wheel is a series of lugs 93 which engage successively with a cam projection 95 on a lever 94 pivoted at one end and having its other end urged downward by means of a spring 100 secured to a post 101. Pivoted to the free end of lever 94 is a pawl 96 which engages the teeth 97 of a ratchet 98 mounted on the shaft 104. From Figure 8 it will be seen this construction is such that as wheel 92 rotates the lever 94 oscillates and causes step by step rotation of the ratchet 98. This ratchet 98 is fixed on a sleeve 102 which also carries the ratchet or cam wheel 103 provided with outer cam portions 105 and inner cam portions 106. This cam wheel engages one or the other of the pins 107 on the rod 23.

The wheel 37 is the minute type wheel and rotating with this wheel is a ratchet wheel 108, termed the finder wheel and having 60 notches therein corresponding to the indications of 60 minutes, slidably mounted beneath this wheel in brackets 109 and 110 is finder rod 111 bevelled at its upper end to enter either one of the notches of wheel 108. This finder rod is normally held in a depressed position by means of a spring 112 bearing at its upper end against the guide 109 and its lower end against a collar 113 on the rod. Carried by the finder rod, is a laterally extending pin 114 and extending through guides 115 and 116 is a slidable lift bar 117 which is connected to the hammer 44 by a link 118. This lift bar (see Figs. 13, 14 and 15) passes loosely through an opening 119 in the guide 115 and is yieldingly forced against one side of the guide by means of a spring 120. On the lift bar is a lift cam 121 and by inspection of Fig. 7, it will be seen in normal position, the pin 114 is arranged in alinement with the cam 121 and bears against one side of the bar 117, as in Fig. 15. In order that the bar may be operated toward the right without lifting the pin 114, when the lever 49 is depressed, there is provided a pivoted pawl member 122 which is held in normal position by means of a spring 123 attached to a post 124. On the bar 117 is a ratchet 125 which engages said pawl 122 and normally holds the bar 117 in the position shown in Fig. 15.

In Fig. 15 the bar 117 is in the position which it normally occupies, and when the lever 49 is depressed the link 118 will move the bar 117 toward the right until the bar moves past the pawl 122 and into the position shown in Fig. 13. Now when the lever 49 is released and springs upwardly to cause the hammer 44 to strike, the bar 117 will move toward the left as shown in Fig. 14, and as it moves toward the left, the cam 121 will engage the pin 114 and raise the stop rod 111 into contact with one of the notches of the ratchet wheel 108. In consequence the ratchet wheel 108 will be momentarily arrested while the hammer is striking. During the left movement of the bar 117, the ratchet 125 will again engage the pawl 122 so that at the end of the movement, the pawl will swing on its pivot and again force the bar 117 into the position shown in Fig. 15.

The employee, on reaching the runway, may freely pass through, for instance, the turnstile A, as the ratchet wheel 8 of this turnstile, as shown in Fig. 4, will permit counter-clockwise movement of the turnstile. However, he cannot move reversely through this turnstile as the pawl 19 will co-operate with the ratchet 7 and prevent such a return movement. At this time attention is called to the teeth 133 on the ratchet wheel 8. These teeth are in spaced groups around the axis of the turnstile and by referring to Figs. 5 and 6 it may be seen that the employee cannot pass through the turnstile B until he has depressed the treadle 14. Such depression will cause the lowering of the stop rod 11 of the turnstile B and thus permit the employee to pass through this turnstile. It will be noted that with the arms of the stiles in their normal position, (as shown by Figure 2) that the foot pedal 14 is within the inclosure formed by the guard rail D and the guard 10 on arm 5. Any attempt in outside manipulation of the foot pedal 14 and consequent further movement of the stile by the employee just passed through is prevented. This rotation of stile B causes one of the pins 9 to contact with the point of locking finger 34, swinging same through a clockwise motion, which through the pressure of pin 35 against the edge of locking arm 27 swings the latter back to its original position, pulling locking rod 29 longitudinally to the right (see Figure 18), which unlocks the pawl 19, making it possible for the next following employee to operate the time clock and register his card. This unlocking of the mechanism is accomplished by cam 84 in its longitudinal travel, engaging the face of arm 77, which pushes this arm back to its original position (see Figures 17 and 18) whereupon latch 79 drops against stop 80, thus holding the arm 77 until the next cycle of operation takes place. The card chute 43 is now open and the rear end of triple level 60 now free from interference with locking spring 83, (see Figure 7).

When it is desired to reverse the operation of the stiles to permit the outward passage of the employees from their work, the mechanism is reversed in the following manner. A lug 93 having been set on the worm wheel 92 at a predetermined point, corresponding to the time of day at which this reversal of the mechanism is to take place; this lug 93, through the motion of worm wheel 92 comes in contact with cam projection 95 on lever 94 and lifts lever 94, raising the point of feed pawl 96 to the next tooth of ratchet 98, (see Figure 8). When the lug 93 passes under cam projection 95, spring 100 pulls down lever 94 and feeds the ratchet around one tooth. Shifting pin 107 is lifted from depression 106 to elevation 105 through resultant corresponding rotation of cam wheel 103, moving reversing rod 23 longitudinally to the left, a distance, corresponding to the movement of shifting pin 107. This slight movement of reversing rod 23 swings reversing finger 24 in a counter-clockwise direction and brings the point of reversing finger 24 into the path of pin 9 on arm 5, (see Figure 2). This movement of reversing rod 23 also lifts pawl 19 out of engagement with ratchet 7. Stile B can now be rotated in a direction opposite to that shown by arrows, permitting the employees to pass in the outgoing direction. The first employee to turn stile B, brings pin 9 into engagement with reversing finger 24 and swings this finger in a counter-clockwise direction through its entire path or limit of movement. This movement of reversing finger 24 moves reversing rod 23 longitudinally through the balance of its full range of motion. Pawls 19 now have their opposite ends in engagement with the ratchets 7 and both stiles are operable in a direction opposite to the arrows; the movement of reversing rod 23 also moves bracket 74 with its appended sliding block 69 to a position under the left-hand arm of shifting yoke 72, also moves shifting pin 107 into a depression 106 of cam wheel 103; the mechanism is now reversed and the operation thereof corresponds to that which took place at the time the employees were entering in the direction of arrows; stile B now becoming the entering stile and A becomes the exit stile.

Having thus described my invention, what is claimed as new, is:

1. In a device of the kind described, a time clock having time card receiving and stamping means and an operating lever for actuating the stamping means, a turnstile, a releasable locking means controlling the lever and arranged to lock the same against movement after one complete operation, and lock releasing means connected to and operable by the movement of the turnstile, said lock releasing means being arranged to move the locking means to unlocked position.

2. In a device of the kind described, a time clock having time card receiving and stamping means and an operating lever for actuating the stamping means, a turnstile, a releasable locking means controlling the lever and arranged to lock the same against movement after one complete operation, locking releasing means connected to and operable by the movement of the turnstile, said lock releasing means being arranged to move the locking means to unlocked position and a card receiver cut off connected to and operable by the locking means to effect closure of the card receiver upon the locking means being moved to locking position.

3. In a device of the kind described, a time clock having time card receiving and stamping means and an operating lever for actuating the stamping means, a turnstile, a releasable locking means controlling the lever and arranged to lock the same against movement of the one complete operation, lock releasing means connected to and operable by the movement of the turnstile, said lock releasing means being arranged to move the locking means to unlocked position, a second turnstile, other lock releasing means connected to the second turnstile and operable by the movement thereof, the means at one turnstile being in operative position and the means at the other turnstile being in inoperative position, and means to shift the relative position of the lock releasing means and cause the operatively positioned means to move to inoperative position and the inoperatively positioned means to move to operative position.

4. In a device of the kind described, a time clock having time card receiving and stamping means and an operating lever for actuating the stamping means, a turnstile, a releasable locking means controlling the lever and arranged to lock the same against movement after one complete operation, lock releasing means connected to and operable by the movement of the turnstile, said lock releasing means being arranged to move the locking means to unlocked position, a second turnstile, other lock releasing means connected to the second turnstile and operable by the movement thereof, the means at one turnstile being in operative position and the means at the other turnstile being in inoperative position, means to shift the relative positions of the lock releasing means and cause the operatively positioned means to move to inoperative position and the inoperatively positioned means to move to operative position and a card receiver cut off connected to and operable by the locking means to effect closure of the card receiver upon the locking means being moved to locking position.

5. In a device of the kind described, a time clock having time card receiving and stamping means and an operating lever for actuating the stamping means, a turnstile, a releasable locking means controlling the lever and arranged to lock the same against movement after one complete operation, lock releasing means connected to and operable by the movement of the turnstile, said lock releasing means being arranged to move the locking means to unlocked position, a second turnstile, other lock releasing means connected to the second turnstile and operable by the movement thereof, the means at one turnstile being in operative position and the means at the other turnstile being in inoperative position, means to shift the relative positions of the lock releasing means and cause the operatively positioned means to move to inoperative position and the inoperatively positioned means to move to operative position, said last mentioned means being controlled by the mechanism of said clock.

In testimony whereof I have affixed my signature.

FRED WAYMAN.